US008608041B1

(12) United States Patent
Adkisson

(10) Patent No.: US 8,608,041 B1
(45) Date of Patent: Dec. 17, 2013

(54) MULTI-ANGLE MODULAR ATTACHMENT SYSTEM

(75) Inventor: Steve Adkisson, Redondo Beach, CA (US)

(73) Assignee: Major Surplus and Survival, Inc., Gardena, CA (US)

( * ) Notice: Subject to any disclaimer, the term of this patent is extended or adjusted under 35 U.S.C. 154(b) by 246 days.

(21) Appl. No.: 12/985,029

(22) Filed: Jan. 5, 2011

(51) Int. Cl.
*A45F 5/00* (2006.01)
*B32B 3/06* (2006.01)

(52) U.S. Cl.
USPC ............. 224/651; 2/102; 224/182; 224/223

(58) Field of Classification Search
USPC ............. 224/650, 651, 182, 191, 223, 675; 428/99, 100; 442/185, 186; 2/102; 108/28; 24/3.1, 3.7, 578.13, 580.1
See application file for complete search history.

(56) References Cited

U.S. PATENT DOCUMENTS

| 5,724,707 | A | 3/1998 | Kirk et al. |
| 6,823,566 | B2 | 11/2004 | Coffey |
| 7,200,871 | B1 | 4/2007 | Carlson |
| 2007/0289045 | A1 | 12/2007 | Evans et al. |
| 2009/0117300 | A1* | 5/2009 | Thompson .................. 428/35.2 |

* cited by examiner

*Primary Examiner* — Adam Waggenspack
(74) *Attorney, Agent, or Firm* — Wood, Herron & Evans, LLP

(57) ABSTRACT

An attachment system for load-bearing equipment includes two sets of parallel webbing strips disposed at an angle to each other. The straps are attached to equipment base fabric such that they form vertical channels between the webbing and the fabric which are at an angle relative to both sets of straps and diagonal channels between the webbing and the fabric which are parallel to one of the sets of straps. An accessory can be mounted in any of at least three different orientations by running accessory straps parallel to one of the sets of webbing strips or running the straps within the vertical channels.

9 Claims, 5 Drawing Sheets

MULTI-ANGLE MODULAR ATTACHMENT SYSTEM

FIELD OF THE INVENTION

The invention is generally related to systems for carrying equipment, and more particularly, to a fastening system that securely mounts removable pockets, pouches, or equipment on a textile surface.

BACKGROUND OF THE INVENTION

For many types of field personnel, the efficiency of load-bearing equipment is crucial. Load-bearing equipment must be able to accommodate a variety of removable pieces. The equipment needs to be able to effectively distribute a large weight and volume of equipment, while allowing for sufficient customization to allow for convenient access of select equipment when necessary.

To satisfy these goals, many types of military and tactical load bearing equipment use the Pouch Attachment Ladder System, or PALS. The PALS system includes a set of horizontal strips of webbing sewn into the fabric of load bearing equipment. The system is a standardized grid of one-inch (2.54 cm) width strips of webbing, spaced apart one inch (2.54 cm) vertically, and connected to the backing fabric by stitching spaced at one and one half inch (3.8 cm) intervals. A complementary set of attachment strips is found on the modular accessory. A description of this system can be found in U.S. Pat. No. 5,724,707 to Kirk et. al. PALS is currently used by the U.S. Armed Forces as the central standardized component of its Modular Lightweight Load-carrying Equipment, or MOLLE. PALS strips are found on load-bearing equipment of all kinds, including vests and jackets, rucksacks and other field packs, and belts.

A large variety of removable pouches, holsters, and other items interface with these strips, which allow each vest or pack to include whichever modular accessories are necessary to the mission, and allow each individual to easily access the correct gear. Many pieces of equipment designed for PALS engagement have two or more straps, each strap engaging with multiple strips by fitting into the vertically aligned slots in each strip. By fitting each strap through both the webbing on the load bearing equipment and the webbing on the accessory, the accessory is closely and securely fastened to the equipment. The strips are lightweight but sturdy and add very little bulk to the equipment. Modular accessories engage securely and with little noise but can be attached or removed quickly.

The traditional PALS system suffers from a lack of flexibility with respect to direction of attachment. Accessory straps will usually need to engage the webbing along the vertical direction as defined by the spaced openings in the webbing, which is perpendicular to the webbing strips themselves. The interface of the accessory webbing with the equipment webbing only allows for a single orientation for mounting the accessory. Existing accessories have been built which include engaging straps and webbing which are at an angle relative to the body of the accessory so that they will mount at an angle from the vertical when attached to PALS webbing. Other accessories include an interface which allows the accessory to rotate relative to the webbing. However, the interface created by the PALS webbing is still generally limited to the single direction presented by the standard configuration.

It would be desirable to have a lightweight system of engaging modular accessories to load bearing equipment that easily allows attachment at several angles. It would also be desirable for a new design for load-bearing equipment to accommodate existing modular accessories designed for MOLLE and PALS without requiring a redesign of the accessories or rendering current accessories and equipment obsolete.

SUMMARY OF THE INVENTION

In one embodiment, an attachment system for use on load-bearing garments and equipment includes sets of parallel webbing strips running in two different directions, the strips being stitched to backing fabric at each location where the two sets of strips intersect. Each set of stitching may be a vertical line of stitching in the same orientation, the orientation of the stitching being at a substantial angle relative to the orientation of both sets of webbing.

DETAILED DESCRIPTION

Figure 1:
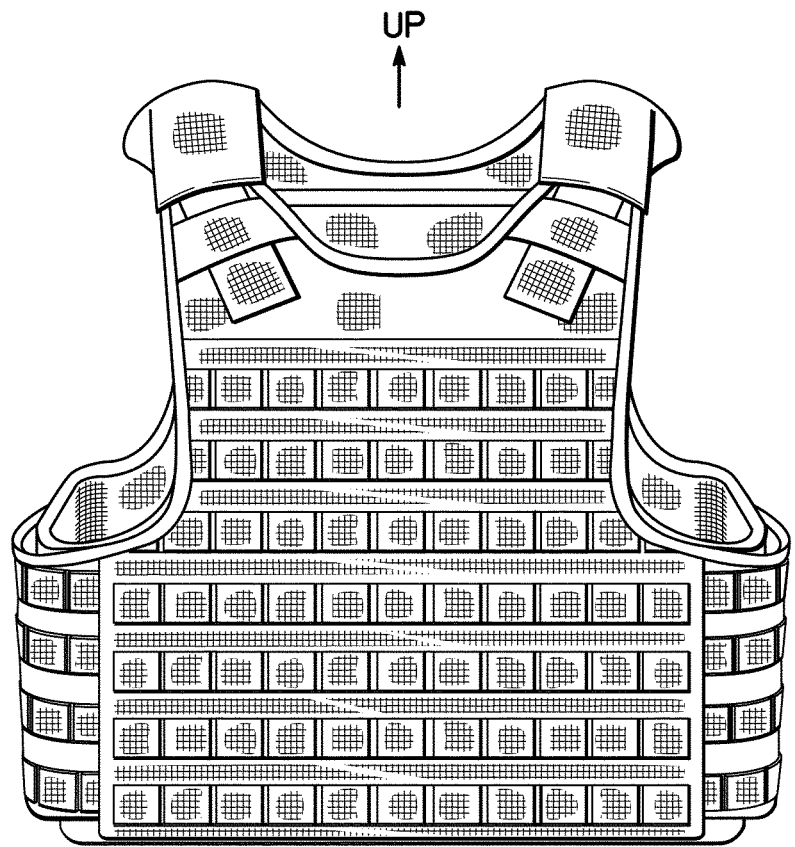
FIG. 1 is a front view of a vest including the prior art PALS webbing.

FIG. 1 shows an example of prior art vest that includes PALS webbing as understood by one skilled in the art. Horizontal strips of webbing are attached to the vest at set intervals, providing regular gaps of a set width. The direction marked "UP" on the diagram marks the single orientation in which interface is possible. A user mounting a PALS accessory aligns the accessory's webbing between the strips of webbing shown, and engages the straps with sets of webbing to secure the accessory.

Figure 2:
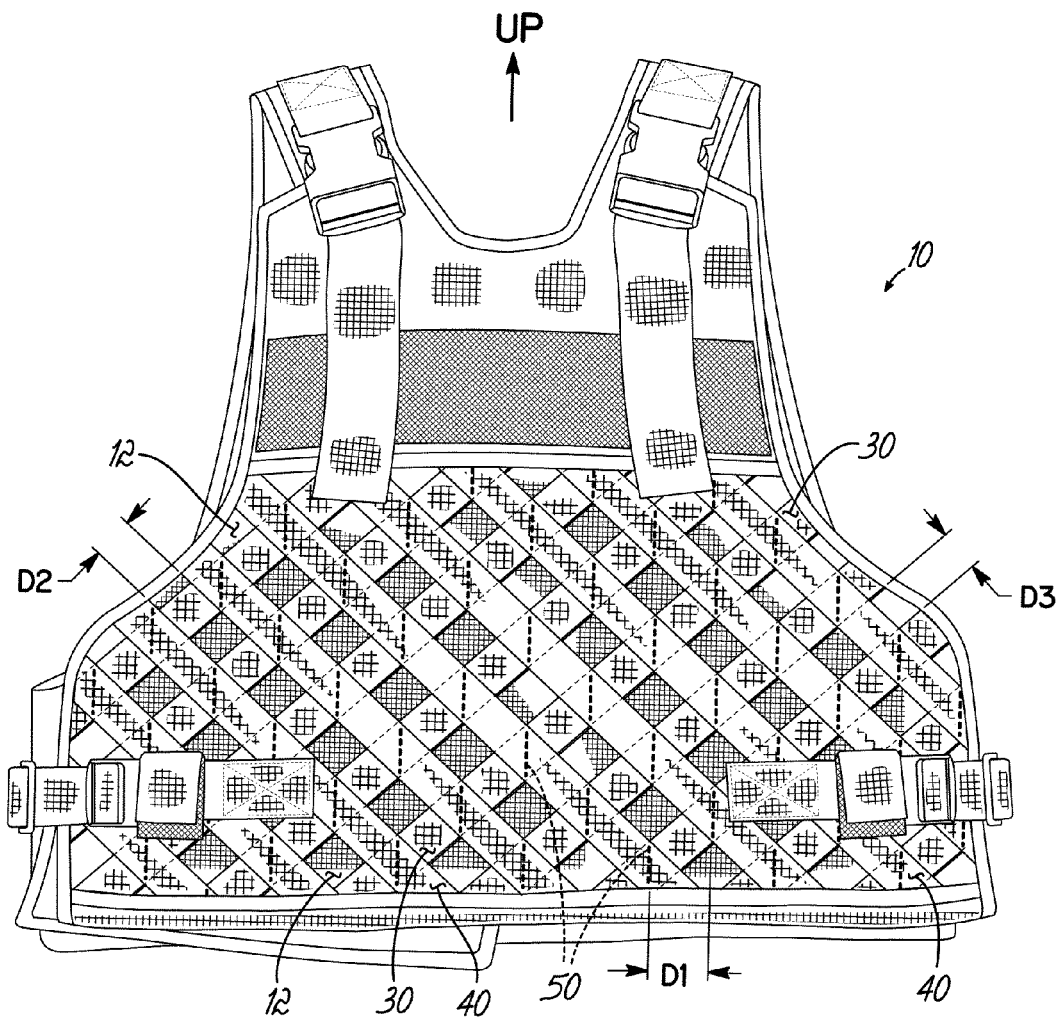
FIG. 2 is a front view of a vest including webbing consistent with the present invention.

FIG. 2 shows a vest with an improved attachment system 20 allowing for multiple directions of engagement. The vest 10 includes a backing material 12 in the region where the webbing 30, 40 is found. Each set of webbing strips 30, 40 may be made of a strong and lightweight material such as nylon webbing. One of ordinary skill in the art will understand that a variety of materials may be used based on weight, cost, flexibility, and durability requirements without departing from the teachings herein.

Figure 3:
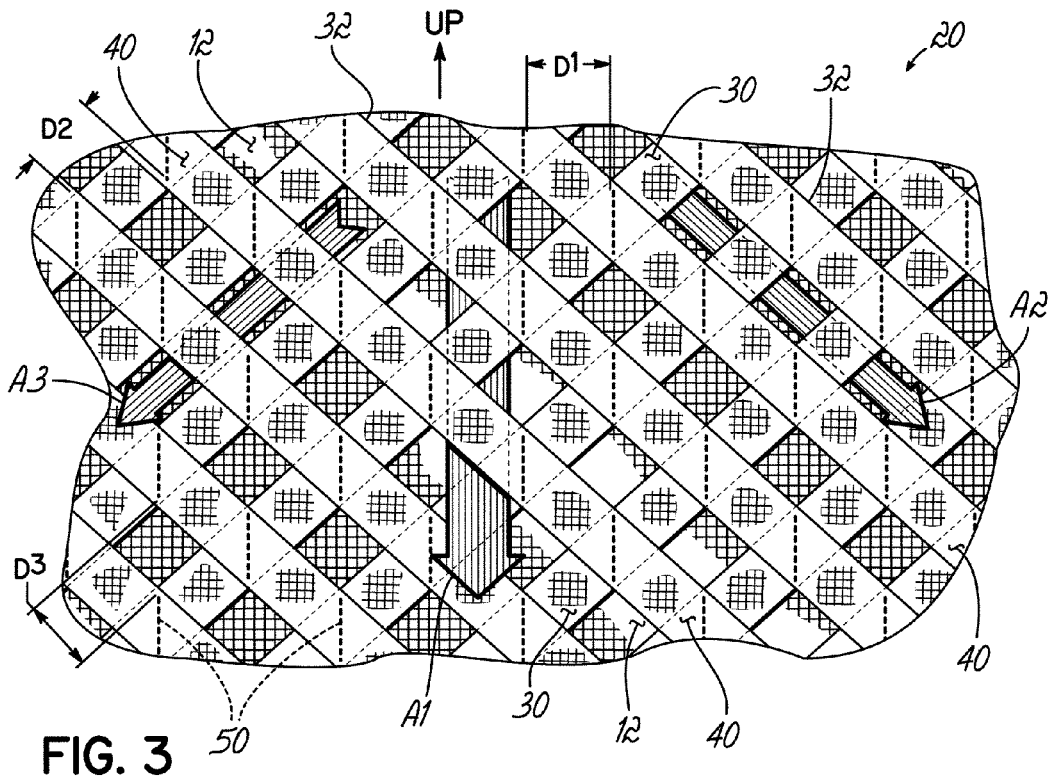
FIG. 3 is a plan view of a portion of the webbing system.

FIG. 3 shows the system 20 in more detail. Two sets of parallel straps of webbing 30, 40 cross each other. Looking at orientations relative to the "UP" direction as marked, both sets of webbing are declined approximately 45° from the vertical, in opposite directions. Thus the two sets of webbing 30, 40 in this embodiment are oriented approximately at right angles relative to each other. A line of vertical stitching, represented by heavy broken lines 50, is used at intersections 32 between the two sets of webbing 30, 40. The exact nature of the vertical stitching will depend on the nature of the backing 12 and the webbing 30, 40. From the PALS standard, one of ordinary skill will understand how thread appropriate for heavy-duty nylon straps can be used to stitch vertical lines with a small horizontal profile, as necessary for the attachment stitching 50. The attachment stitching 50 may extend substantially from corner to corner (vertically) in the areas of intersection 32 and is, preferably about 1 inch (2.54 cm) in length when one-inch (2.54 cm) webbing is used at one-inch (2.54 cm) spacing. In an alternative embodiment, described below, the stitching may be reduced in length, if desired for other purposes.

The vertical orientation of the stitching 50 provides maximum clearance for the vertical channels found therein, which may be appropriately sized to the PALS standard. As illustrated by the vertical arrow A1, the vertical channels are common to both sets of straps 30, 40 and are formed by stitching 50 positioned alternately at either side along the length of the channel. When attachment straps are placed within these vertical channels, either the upper set 40 or both sets 30, 40 of webbing may hold the straps in place. The width of the channels D1 may be approximately one and one half inches (3.8 cm) wide, according to the PALS standard, or may be larger or smaller as appropriate for the garment and application of the system.

Channels demonstrated by diagonal arrows A2 and A3 are also created by the gaps between rows of webbing, which allow for two additional directions of accessory attachment, as shown. The accessory's webbing may be aligned with one set of the equipment webbing, which would allow the accessory straps to engage with the other set, the straps running essentially parallel to the unengaged set of webbing. Thus, accessories with PALS-compliant straps will generally be able to engage the improved webbing either directly vertically (shown at A1) or at either diagonal (shown at A2 and A3). The width of the diagonal channels D2, D3 is defined between opposite termination points of the attachment stitching 50 and may be approximately 1.2 to 1.4 inches (3.0-3.56 cm) wide in order to accommodate the traditional PALS width for the vertical channel D1, or may be larger or smaller as appropriate. One of ordinary skill will understand that the orientation of the webbing strips as well as the desired width of the vertical channels will constrain the size and availability of the diagonal channels to conform within certain parameters. However, substantial variations are still possible by varying orientation angles or allowing for differences between the two sets of strips.

Figure 4:
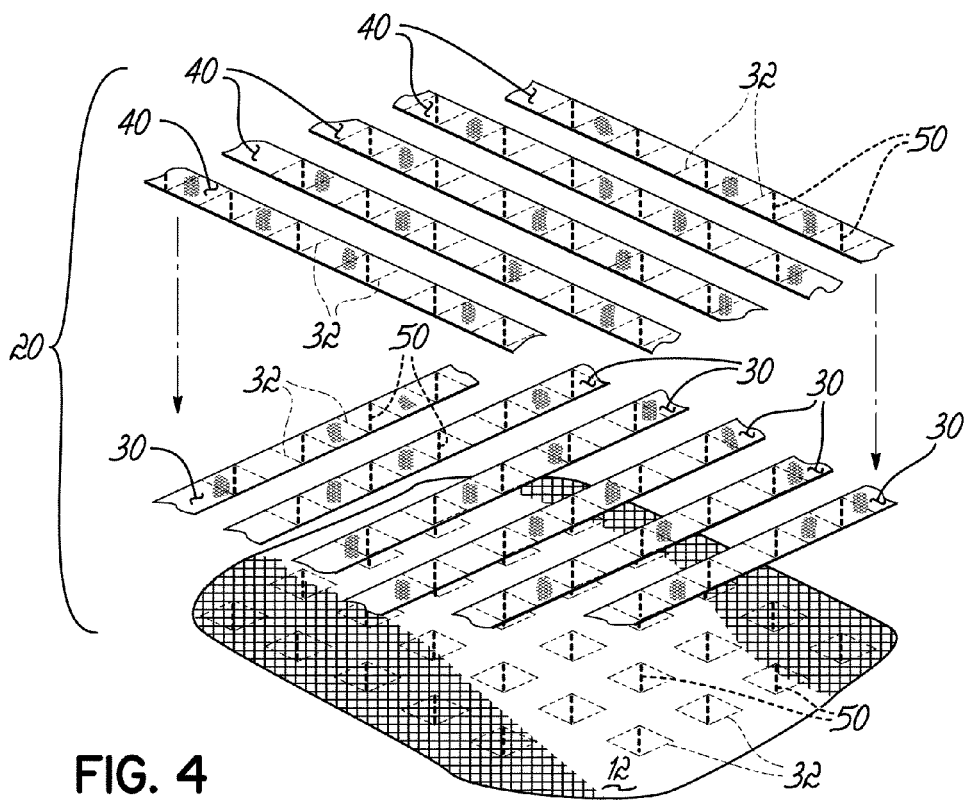
FIG. 4 is an exploded view of the webbing system.

The improved webbing system 20 can be constructed or assembled using a minimum number of operations and a minimum amount of additional material over the standard PALS grid. Because each of the parallel strips of webbing that are part of the first set 30 are disposed below each of the strips of webbing that are part of the second set 40, the lower set of webbing 30 can be laid against the backing 12 first, and then the second set of webbing 40 laid on top of the first set 30. Both sets of webbing 30, 40 can then be stitched onto the backing 12 as shown and described using any appropriate manner of stitching 50. FIG. 4 shows an exploded view with the second set of webbing 40 lying above the first set 30 which lies above the backing layer 12. Lines of stitching 50 and areas of intersection 32 are shown on all three layers 12, 30, and 40 to illustrate their attachment. One or both sets of webbing 30, 40 may be temporarily tacked or basted in place during assembly, if desired. Assembly is greatly simplified by the fact that it is not necessary to interweave the sets of webbing 30, 40.

Figure 5:
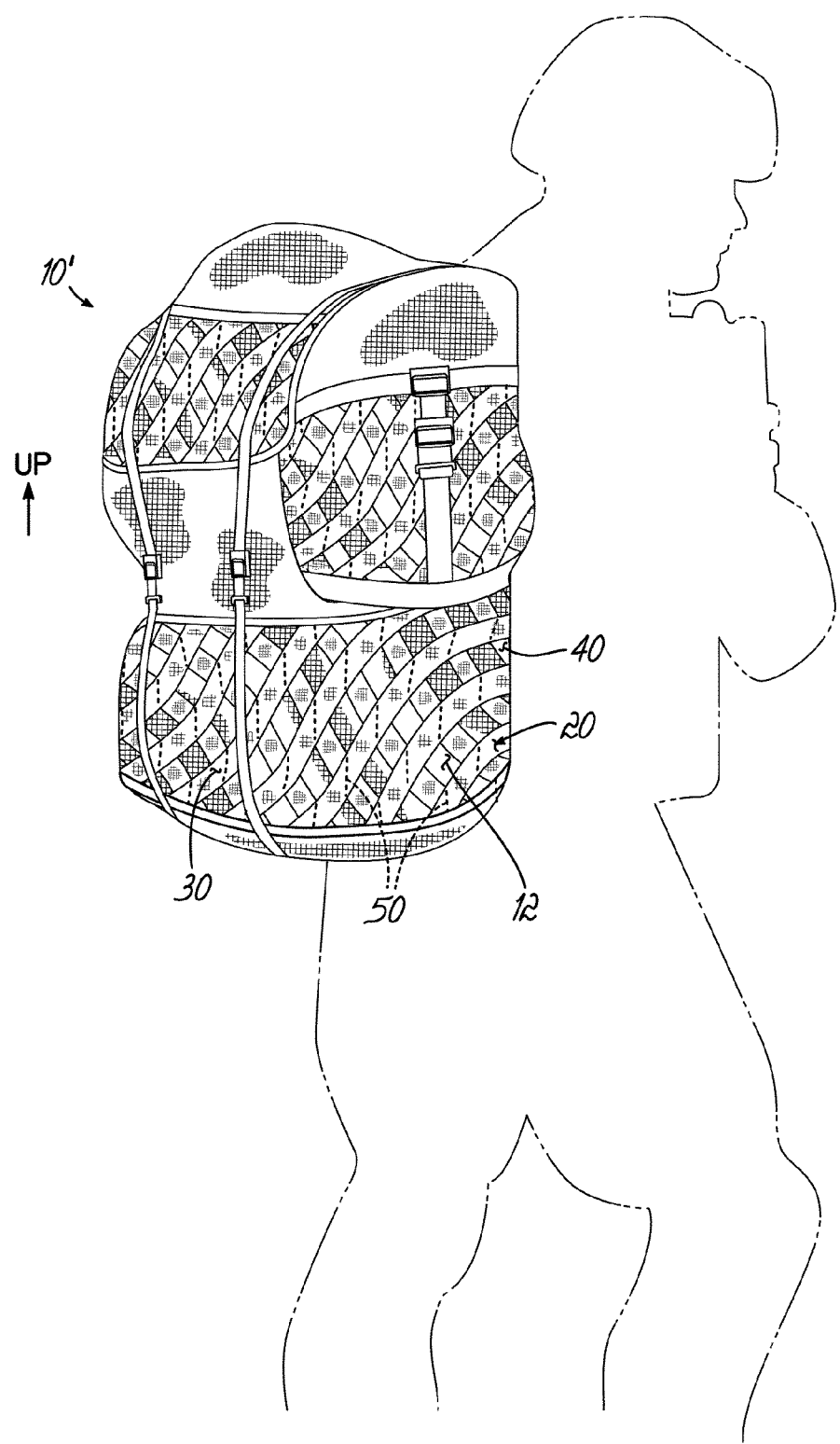
FIG. 5 is a side view of a pack including a webbing system consistent with the present invention.

Virtually any type of pouch or device suitable for PALS webbing can use this improved webbing system instead. As shown in FIG. 5, a pack 10' or other load-bearing equipment may include this webbing system 20, allowing PALS-compatible accessories to be mounted either vertically or at an angle on the equipment without any modification to the accessory.

Figure 6:
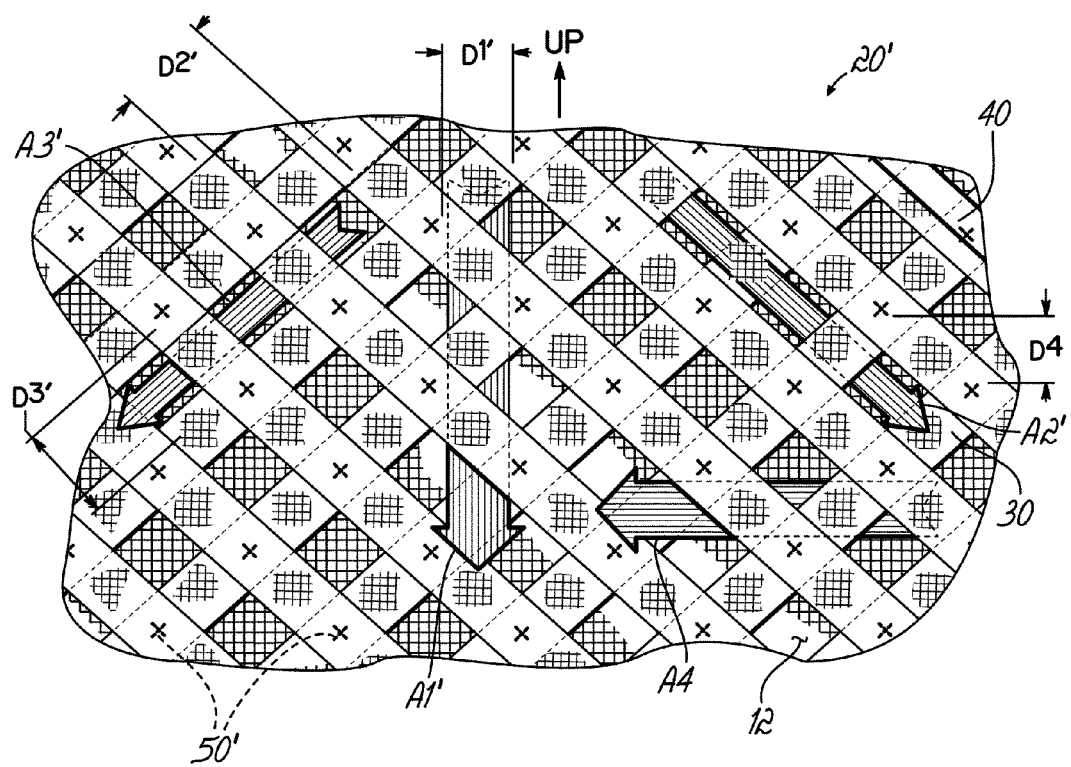
FIG. 6 is a view of a portion of an alternate webbing system consistent with the present invention.

One of ordinary skill in the art will understand how variations in the dimensions, materials, angles, and stitching of the webbing may benefit the user in different applications. For example, as shown in FIG. 6, an alternate embodiment of the system 20' may include stitching 50' within a narrow region at the center of each intersection 32 between the sets of webbing 30, 40. Although the horizontal dimension of the alternate stitching pattern 50' shown in FIG. 6 may to a minor extent reduce the available width D1' of the vertical channel shown by A1', reduction of the vertical component of each stitching pattern 50' makes available a horizontal attachment channel as shown by A4. Each vertical and horizontal channel may be between about 1.2 and 1.4 inches (3.0-3.56 cm) in width D1', D4. Diagonal channels A2 and A3 remain available and may gain width D2', D3' compared to the embodiment of FIGS. 2, 3 and 4. The placement and dimensions of the stitching 50' may be carefully controlled to provide a consistent clearance for straps disposed therein. Because the stitching 50' is in a more concentrated area compared to the elongated vertical lines of stitching shown in FIGS. 2, 3 and 4 and described above, the stitching 50' may be specially reinforced to meet strength requirements as understood by one in the art. Although a stitched X pattern is shown, other attachments which take up a similarly reduced area may be employed, such as a circle, simple tack spot, or a vertical row of stitching as shown in FIG. 3, but reduced in length to approximately 0.6 inch (1.5 cm). Alternatively, grommets or other solid fasteners may be placed in the center of the intersection 32, or a small region of adhesive or thermal fusion may be used.

Although the drawings presented herein mark a direction for "UP" that generally coincides with the direction that will commonly be "UP" to the wearer of the load-bearing equipment, it will be understood that the improved attachment system 20 can be oriented in any direction, and that "UP" and "vertical" as used herein are relative and arbitrarily assigned terms. For example, the system may be assembled with the sets of webbing 30, 40 mounted vertically and horizontally, respectively. In such an orientation, relative to the wearer, the channels shown by the arrows A1 would be at a diagonal, the channels shown by the arrows A2 would be oriented vertically, and the channels shown by the arrows A3 would be oriented horizontally. Any other orientation of the system may be used as appropriate.

Other modifications will be apparent to one of ordinary skill in the art. Therefore, the invention lies in the claims hereinafter appended.

What is claimed is:

1. An attachment system for load-bearing equipment, comprising:
    an area of base fabric;
    a first plurality of parallel webbing strips attached to the area of fabric, the first plurality of webbing strips having a substantially uniform width, the first plurality of webbing strips spaced apart at a distance of approximately at least their width;
    a second plurality of parallel webbing strips attached to the area of fabric, the second plurality of webbing strips having a substantially uniform width, the second plurality of webbing strips spaced apart a distance of approximately at least their width and oriented generally perpendicular to the first plurality of strips;
    wherein each of the second plurality of webbing strips overlaps at least one of the first plurality of webbing strips, forming a region of intersection at each overlap;
    wherein the first and second pluralities of webbing strips are attached to the area of fabric at locations within substantially all of the regions of intersection; the first and second plurality of webbing strips constitute substantially all of the webbing strips attached to the area of base fabric and wherein the attachment system provides a first plurality of parallel channels which are oriented oblique to the first and second pluralities of webbing strips, each of the first plurality of parallel channels defined by part of the area of fabric, part of at least one of the first and second pluralities of webbing strips, and by attachments at substantially all the areas of intersection, and a second plurality of parallel channels which are oriented substantially parallel to one of the first and second pluralities of webbing strips, substantially perpendicular to the other of the first and second pluralities of webbing strips, and oblique to the first plurality of webbing channels, each of the first and second pluralities of channels being substantially free of and defined between locations of attachment between the webbing strips and the fabric such that an accessory strap is placed directly between the webbing strips and the fabric within each channel.

2. The attachment system of claim 1, wherein the first and second pluralities of webbing strips are attached to the area of fabric by means of stitching, and wherein the stitching at the locations of attachment runs substantially parallel to the first plurality of channels.

3. The attachment system of claim 1, wherein the widths of the first and second pluralities of webbing strips are each approximately one inch.

4. The attachment system of claim 1, wherein the first plurality of channels each have a substantially uniform width of approximately one and one half inch.

5. The attachment system of claim 1, wherein the second plurality of parallel channels are oriented substantially parallel to the first plurality of webbing strips and substantially perpendicular to the second plurality of webbing strips, and further comprising a third plurality of parallel channels which are oriented substantially parallel to the second plurality of webbing strips and substantially perpendicular to the first plurality of webbing strips.

6. An attachment system for load-bearing equipment, comprising:
  an area of base fabric;
  a system of substantially perpendicular webbing strips sets with a plurality of regions of webbing overlap, wherein the system of webbing strips sets is attached to the area of fabric at substantially all locations of webbing overlap, and
  a first channel, a second channel, and a third channel, each channel configured to receive an accessory strap, and each channel being defined by and directly between part of the system of webbing, part of the area of fabric, and the locations of attachment;
  wherein each of the first, second, and third channels are configured to receive an accessory strap in a first, second, and third orientation respectively, wherein the first, second, and third orientations are all substantially different orientations, wherein the first channel is substantially oblique to the webbing strips and the second and third channels are substantially perpendicular to each other and each substantially parallel to one of the webbing sets, the first and second plurality of webbing strips constitute substantially all of the webbing strips attached to the area of base fabric and wherein the width of the channels are substantially delimited by the regions of attachment.

7. The attachment system of claim 6, wherein the regions of attachment are lines of stitching, and wherein the lines are oriented in approximately substantially parallel to the first orientation and substantially oblique to the webbing strips.

8. The attachment system of claim 6, wherein the first channel has a width of approximately one and one half inches, and wherein the second and third channels each have a width of approximately one inch.

9. An attachment system for load-bearing equipment, comprising:
  an area of base fabric;
  a first plurality of parallel webbing strips attached to the area of fabric, the first plurality of webbing strips having a substantially uniform width, the first plurality of webbing strips spaced apart at a distance of approximately at least their width;
  a second plurality of parallel webbing strips attached to the area of fabric, the second plurality of webbing strips having a substantially uniform width, the second plurality of webbing strips spaced apart a distance of approximately at least their width and oriented generally perpendicular to the first plurality of strips;
  wherein each of the second plurality of webbing strips overlaps at least one of the first plurality of webbing strips, forming a region of intersection at each overlap;
  wherein the first and second pluralities of webbing strips are attached to the area of fabric at locations within substantially all the regions of intersection; the first and second plurality of webbing strips constitute substantially all of the webbing strips attached to the area of base fabric and
  wherein the attachment system provides a first plurality of parallel channels which are oriented nonparallel to the first and second pluralities of webbing strips, each of the first plurality of channels defined by and directly between part of the area of fabric, part of at least one of the first and second pluralities of webbing strips, and the attachments at the regions of intersection, a second plurality of parallel channels which are oriented nonparallel to the first and second pluralities of webbing strips and substantially perpendicular to the first plurality of channels, each of the second plurality of channels defined by part of the area of fabric and part of at least one of the first and second pluralities of webbing strips, a third plurality of parallel channels which are oriented substantially parallel to the first plurality of webbing strips and substantially perpendicular to the second plurality of webbing strips, each of the third plurality of channels defined by part of the area of fabric and part of the second plurality of webbing strips, a fourth plurality of parallel channels which are oriented substantially parallel to the second plurality of webbing strips and substantially perpendicular to the first plurality of webbing strips, each of the fourth plurality of channels defined by part of the area of fabric and part of the first plurality of webbing strips, and each of the first, second, third, and fourth plurality of channels being substantially free of locations of attachment between the webbing strips and the fabric such that an accessory strap can be placed directly between the webbing strips and the fabric within each channel.

* * * * *